(12) United States Patent
Schaefer

(10) Patent No.: US 12,499,598 B2
(45) Date of Patent: Dec. 16, 2025

(54) SCALABLE ROAD GRAPH GENERATION

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 18/428,837

(22) Filed: Jan. 31, 2024

(65) Prior Publication Data
US 2025/0245887 A1  Jul. 31, 2025

(51) Int. Cl.
*G06T 11/60* (2006.01)

(52) U.S. Cl.
CPC .................... *G06T 11/60* (2013.01)

(58) Field of Classification Search
CPC ....................................... G06T 11/60
USPC ......................................... 345/629
See application file for complete search history.

(56) References Cited

U.S. PATENT DOCUMENTS

| | | | |
|---|---|---|---|
| 8,396,325 B1 | 3/2013 | Kwatra et al. | |
| 8,681,151 B2* | 3/2014 | Coombe | G06T 17/20 345/629 |
| 8,799,799 B1* | 8/2014 | Cervelli | G06F 16/29 707/723 |
| 8,994,822 B2 | 3/2015 | Smitherman et al. | |
| 9,396,563 B2* | 7/2016 | Arikan | G06T 11/60 |
| 10,067,950 B1* | 9/2018 | Zyskowski | G06T 7/74 |
| 10,217,232 B2 | 2/2019 | Harada | |
| 10,378,909 B2* | 8/2019 | Gonopolskiy | G01C 21/3667 |
| 10,902,655 B1* | 1/2021 | Snyder | G06F 16/24552 |
| 11,188,557 B2* | 11/2021 | Yu | G06F 16/26 |
| 2008/0150963 A1* | 6/2008 | Stambaugh | G01C 21/30 345/629 |
| 2012/0038662 A1* | 2/2012 | Dicklin | G09G 5/377 345/635 |
| 2013/0322702 A1* | 12/2013 | Piemonte | G06T 19/20 382/113 |
| 2013/0328916 A1* | 12/2013 | Arikan | G01C 21/3867 345/619 |
| 2013/0328924 A1* | 12/2013 | Arikan | G01C 21/3815 345/629 |
| 2015/0066914 A1* | 3/2015 | Sankar | G06F 16/29 707/722 |

(Continued)

*Primary Examiner* — David T Welch
(74) *Attorney, Agent, or Firm* — Christopher G. Darrow; Darrow Mustafa PC

(57) ABSTRACT

Systems, methods, and other embodiments described herein relate to generating, in a scalable manner, a road graph from points in a region of interest. In one embodiment, a method includes partitioning the region of interest into tiles. Each tile has an inner area and an outer area. Each tile has an inner border encapsulating the inner area and separating the inner area from the outer area and an outer border encapsulating the outer area. The tiles overlap neighboring tiles. The method includes generating a portion of a frame graph for each tile based on the points associated with each tile. The method includes generating a portion of a road graph based on the portion of frame graph within each tile and combining the portion of the road graph in the inner area into the road graph based on the points in the outer area of each tile.

20 Claims, 8 Drawing Sheets

(56) References Cited

U.S. PATENT DOCUMENTS

| | | | |
|---|---|---|---|
| 2015/0169976 A1* | 6/2015 | Ibrahim | G06V 30/422 345/629 |
| 2016/0253078 A1* | 9/2016 | Ebtekar | G06T 11/60 715/735 |
| 2016/0378848 A1* | 12/2016 | Basovnik | G06Q 10/02 707/742 |
| 2017/0052747 A1* | 2/2017 | Cervelli | G06T 11/001 |
| 2017/0076473 A1* | 3/2017 | Zawada | G06F 18/25 |
| 2018/0052596 A1* | 2/2018 | Bemel-Benrud | G06T 11/206 |
| 2021/0004611 A1* | 1/2021 | Garimella | G08G 1/166 |
| 2021/0303849 A1* | 9/2021 | Dubroy | G06T 17/05 |
| 2023/0057411 A1* | 2/2023 | Brown | G01C 21/3804 |
| 2023/0349720 A1* | 11/2023 | Jin | G01C 21/3815 |
| 2024/0037823 A1* | 2/2024 | Peng | G06T 3/40 |
| 2025/0022196 A1* | 1/2025 | Le Dem | G06T 11/60 |

\* cited by examiner

SCALABLE ROAD GRAPH GENERATION

TECHNICAL FIELD

The subject matter described herein relates, in general, to systems and methods for generating, in a scalable manner, a road graph from a plurality of points in a region of interest.

BACKGROUND

Points, such as trace points, include sensor information about a road. However, for points distributed over a region of interest, where the region of interest includes multiple roads, it may be difficult to determine the topology and geometry of the road network in the region of interest, particularly in a case where the multiple roads are side-by-side or stacked on top of each other. Processing a point map into a format that is useful for data analysis can be both labor and resource intensive and inaccurate.

SUMMARY

In one embodiment, a system for generating, in a scalable manner, a road graph from a plurality of points in a region of interest is disclosed. The system includes a processor and a memory in communication with the processor. The memory stores machine-readable instructions that, when executed by the processor, cause the processor to partition a region of interest into a plurality of tiles. The region of interest includes a plurality of points. Each of the plurality of tiles has an inner area and an outer area. Each of the plurality of tiles has an inner border encapsulating the inner area and separating the inner area from the outer area. Each of the plurality of tiles has an outer border encapsulating the outer area. The plurality of tiles overlap neighboring tiles. In other words, adjacent tiles overlap each other. The machine-readable instructions further include machine-readable instructions that, when executed by the processor, cause the processor to generate a portion of a frame graph for each of the plurality of tiles based on one or more of the plurality of points associated with the each of the plurality of tiles. The machine-readable instructions further include machine-readable instructions that, when executed by the processor, cause the processor to generate a portion of a road graph based on the portion of frame graph within each tile and combine the portions of the road graph based on the points in the inner areas of the tiles into a final road graph that spans the whole region of interest.

In another embodiment, a method for generating, in a scalable manner, a road graph from a plurality of points in a region of interest is disclosed. The method includes partitioning a region of interest into a plurality of tiles. The region of interest includes a plurality of points. Each of the plurality of tiles has an inner area and an outer area. Each of the plurality of tiles has an inner border encapsulating the inner area and separating the inner area from the outer area. Each of the plurality of tiles has an outer border encapsulating the outer area. The plurality of tiles overlap neighboring tiles. In other words, adjacent tiles overlap each other. The method includes generating a portion of a frame graph for each of the plurality of tiles, based on one or more of the plurality of points associated with each of the plurality of tiles. The method includes generating a portion of a road graph based on the portion of frame graph within each tile and combining the portion of the road graph in the inner area into a final version of the road graph based on the plurality of points in the outer area of each of the plurality of tiles.

In another embodiment, a non-transitory computer-readable medium for generating, in a scalable manner, a road graph from a plurality of points in a region of interest is disclosed. The non-transitory computer-readable medium includes instructions that, when executed by a processor, cause the processor to perform one or more functions. The instructions include instructions to partition a region of interest into a plurality of tiles. The region of interest includes a plurality of points. Each of the plurality of tiles has an inner area and an outer area. Each of the plurality of tiles has an inner border encapsulating the inner area and separating the inner area from the outer area. Each of the plurality of tiles has an outer border encapsulating the outer area. The plurality of tiles overlapping neighboring tiles. In other words, adjacent tiles overlap each other. The instructions include instructions to generate a portion of a frame graph for each of the plurality of tiles based on one or more of the plurality of points associated with the each of the plurality of tiles. The instructions include instructions to generate a portion of a road graph based on the portion of frame graph within each tile and combine the portion of the road graph in the inner area into a final version of the road graph based on the plurality of points in the outer area of each of the plurality of tiles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
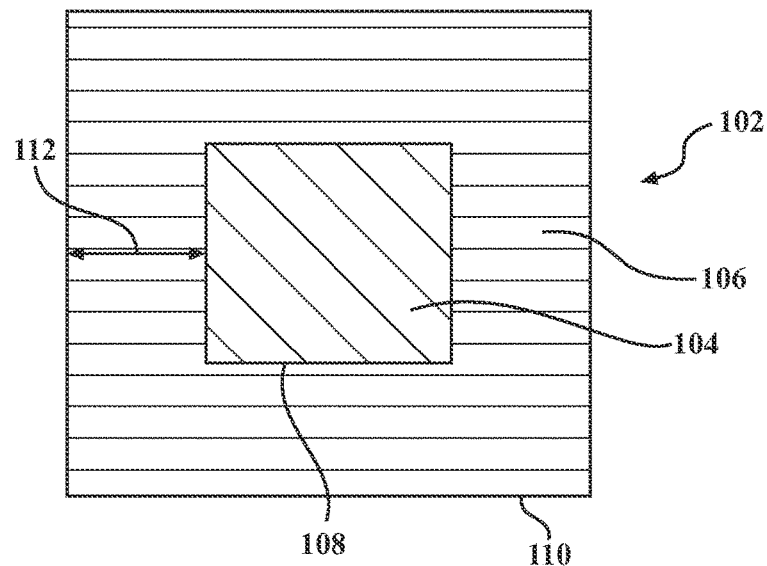
FIG. 1 illustrates an example of a tile.

Systems, methods, and other embodiments associated with systems and methods for generating, in a scalable manner, a road graph from a plurality of points in a region of interest are disclosed. The points may originate from sensor data and may include information about a particular point along a roadway in a region of interest. A point may have metadata that includes a geographical location and various environmental conditions associated with the geographical location. The environmental conditions may include an elevation level, a humidity level, a temperature level, a road gradient level, and/or a light level. Road graphs may identify one or more roadways in the region. As such, road graphs are useful for vehicle navigation, orientation, autonomous driving, pedestrian movement, and/or cycle movement. Systems providing services such as navigation services and mapping systems can provide more accurate information when the roadways within a region are identified. Such systems can more easily utilize a road graph to distinguish between roads at various locations.

Current methods of generating a road graph from a plurality of points can be labor-intensive, time-consuming, expensive, and require extensive storage and computational resources, as the prior art discloses ingesting aerial maps and manually annotating the aerial maps. These methods can be resource-intensive, time-consuming, expensive, and have high levels of inaccuracies.

Accordingly, systems, methods, and other embodiments associated with generating, in a scalable manner, a road graph from a plurality of points in a region of interest are disclosed. The system receives sensor data from the region of interest. The region of interest may include a plurality of points. The system may then partition the region of interest using a plurality of tiles. The tiles have an inner area and an outer area. The tiles also have an inner border that encapsulates the inner area and separates the inner area from the outer area. The tiles have an outer border that encapsulates the outer area. The width of the outer area, which is the distance from the inner border to the outer border, may be based on a minimum road branch length, which is the minimum length of a road graph path that may be considered a road. The size of the inner area may be any suitable size and may be set by a user. The tiles may be of any suitable shape such as a rectangle or a square.

The system arranges the tiles over the plurality of points in the region of interest such that the tiles overlap. The tiles may overlap such that there is an overlap of the inner areas of neighboring tiles. The size of the overlap between neighboring tiles may be based on a maximum distance between points that may be connected by an edge. Additionally and/or alternatively, the size of the overlap between neighboring tiles may be based on user input.

The system may associate the plurality of points with the tile overlaying the plurality of points. The system may then generate a portion of a frame graph based on the plurality of points associated with a tile and within the inner and outer areas of the tile. The system may then generate a portion of a road graph for each portion of the frame graph associated with each tile. The system may identify whether the roadways in the portion of the road graph terminate in the outer area or extend past the outer area. In a case where the roadway terminates in the outer area, the system discards the portion of the roadway in the outer area. In a case where the roadway extends from the inner area, past the outer area, and past the outer border, the system retains the roadway such that the system may utilize the retained roadway for aligning the overlapping tiles.

In other words, the system may generate a road graph for each tile based on the full tile area. The system may then crop the road graph to the respective inner area of each tile. The system may merge the inner road graphs based on the overlap to form a final and complete road graph. The system may align the tiles such that the portions of road graphs from the neighboring and overlapping tiles form one or more continuous roadways.

The embodiments disclosed herein present various advantages over conventional technologies. First, the embodiments can provide a more accurate prediction of the characteristics of the roadways, merging roads, splitting roads, and intersections. Second, the embodiments are less resource-intensive, more cost effective, and more time effective than the prior art. Third, the embodiments are scalable.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 illustrates an example of a tile 102. The tile 102 includes an inner area 104 and an outer area 106. The tile includes an inner border 108 that encapsulates the inner area 104 and separates the inner area 104 from the outer area 106. The tile includes an outer border 110 that encapsulates the outer area 106. The size of the inner area 104 may be determined using any suitable method. As an example, the size of the inner area 104 may be set by user input. In such an example, the size of the inner area 104 may be 10 meters by 10 meters.

The distance 112 between the inner border 108 and the outer border 110 may be based on a minimum road branch length. As an example, the distance 112 between the inner border 108 and the outer border 110 may be equal to the minimum road branch length. The minimum road graph branch length is the minimum distance of a road portion that would be considered a road. As an example, the minimum road graph branch length may be a predetermined distance such as 20 meters. As another example, the minimum road graph branch length 120 may be based on an average or a typical road length in the region. As another example, a user may input a preferred minimum road graph branch length.

As shown and as an example, the inner border 108 and the outer border 110 may be square shaped. However, the tile 102, the inner border 108, and the outer border 110 may be any suitable shape such as a circle, a rectangle, and/or a hexagon.

Figure 2A:
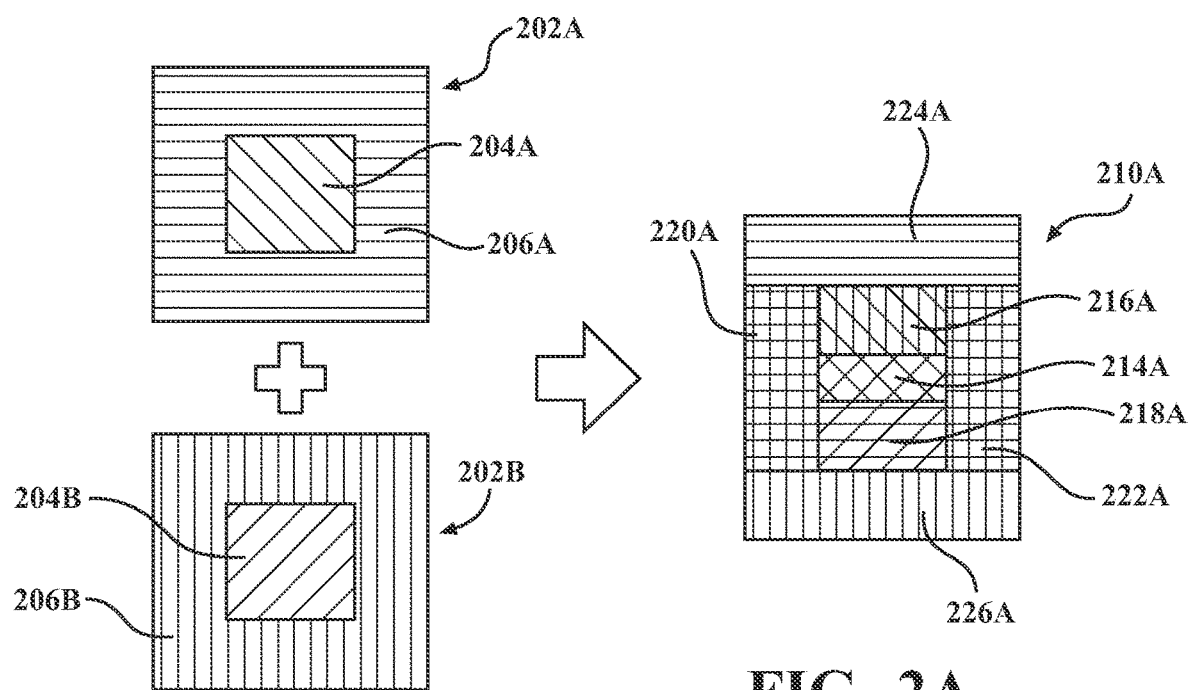
FIGS. 2A-2C illustrate an example of overlapping tile arrangements.
Figure 2B:
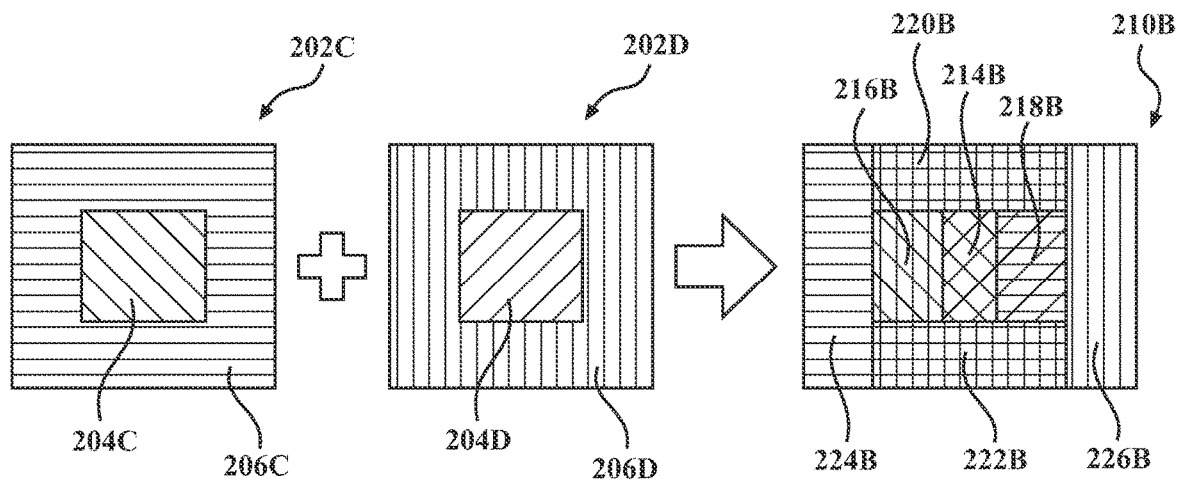
Figure 2C:
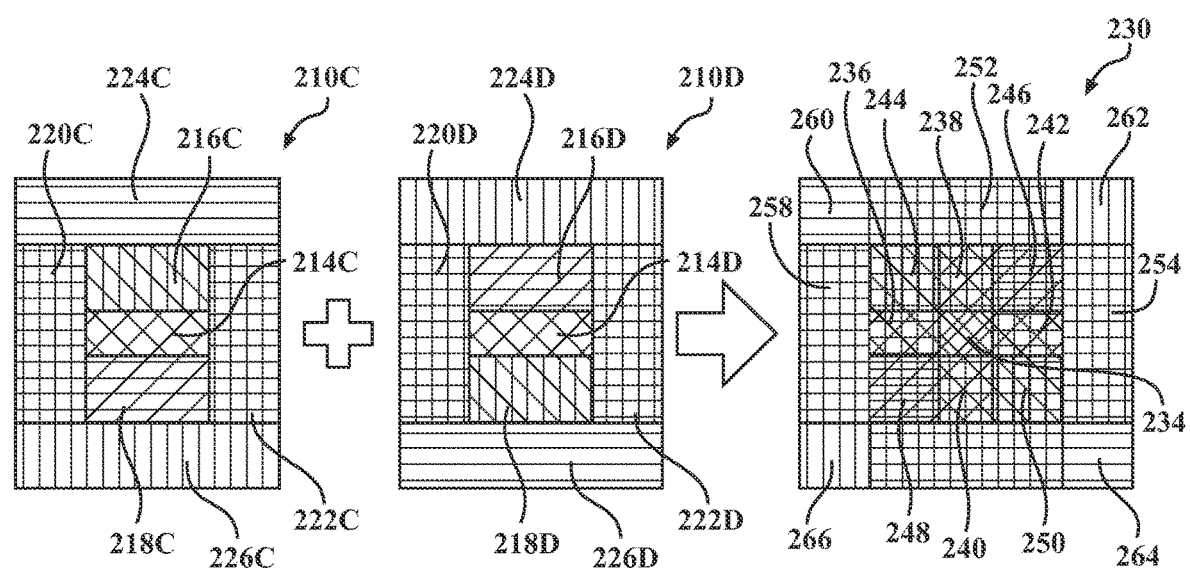

FIGS. 2A-2C illustrate an example of overlapping tile arrangements. As an example and as shown in FIG. 2A, two tiles 202A, 202B, which are similar to the tile 102, shown in FIG. 1, are overlapping. The first tile 202A has an inner area 204A and an outer area 206A and the second tile 202B has an inner area 204B and an outer area 206B. The road graph generating system 100 combines the two tiles 202A, 202B to form a tile arrangement 210A. The tile arrangement 210A includes the first tile 202A and the second tile 202B overlapping each other. The tile arrangement 210A includes a first inner area 214A, two second inner areas 216A, 218A, two first outer areas 220A, 222A, and two second outer areas 224A, 226A. The first inner area 214A is where the inner areas 204A, 204B overlap. The first of the two second inner areas 216A is where the inner area 204A and the outer area 206B overlap. The second of the two second inners 218A is where the inner area 204B and outer area 206A overlap. The two first outer areas 220A, 222A are where the outer areas 206A, 206B overlap. The first of the second two outer areas 224A is a portion of the outer area 206A and the second of the second outer areas 226A is a portion of the outer area 206B.

As an example and as shown in FIG. 2B, two tiles 202C, 202D, which are similar to the tiles 102, 202A, 202B, are overlapping. The third tile 202C has an inner area 204C and an outer area 206C and the fourth tile 202D has an inner area 204D and an outer area 206D. The road graph generating system 100 combines the two tiles 202C, 202D to form a tile arrangement 210B. The tile arrangement 210B includes the third tile 202C and the fourth tile 202D overlapping each other. The tile arrangement 210B includes a first inner area 214B, two second inner areas 216B, 218B, two first outer areas 220B, 222B, and two second outer areas 224B, 226B. The first inner area 214B is where the inner areas 204C, 204D overlap. The first of the two second inner areas 216B is where the inner area 204C and the outer area 206D overlap. The second of the two second inner areas 218B is where the inner area 204D and outer area 206C overlap. The two first outer areas 220B, 222B are where the outer areas 206C, 206D overlap. The first of the two second outer areas 224B is a portion of the outer area 206C and the second of the two second outer areas 226B is a portion of the outer area 206D.

As an example and as shown in FIG. 2C, two tile arrangements 210C, 210D, which are similar to the tile arrangement 210A, shown in FIG. 2A, are overlapping. The third tile arrangement 210C has a first inner area 214C, two second inner areas 216C, 218C, two first outer areas 220C, 222C, and two second outer areas 224C, 226C. The fourth tile arrangement 210D has a first inner area 214D, two second inner areas 216D, 218D, two first outer areas 220D, 222D, and two second outer areas 224D, 226D. The road graph generating system 100 combines the two tile arrangements 210C, 210D to form a fifth tile arrangement 230. The fifth tile arrangement 230 includes the third tile arrangement 210C and the fourth tile arrangement 210D overlapping each other. As shown, the fifth tile arrangement 230 includes a first inner area 234, four second inner areas 236, 238, 240, 242, four third inner areas 244, 246, 248, 250, four first outer areas 252, 254, 256, 258, and four second outer areas 260, 262, 264, 266. As an example, the first inner area 234 is where the inner areas 214C, 214D overlap.

Figure 3A:
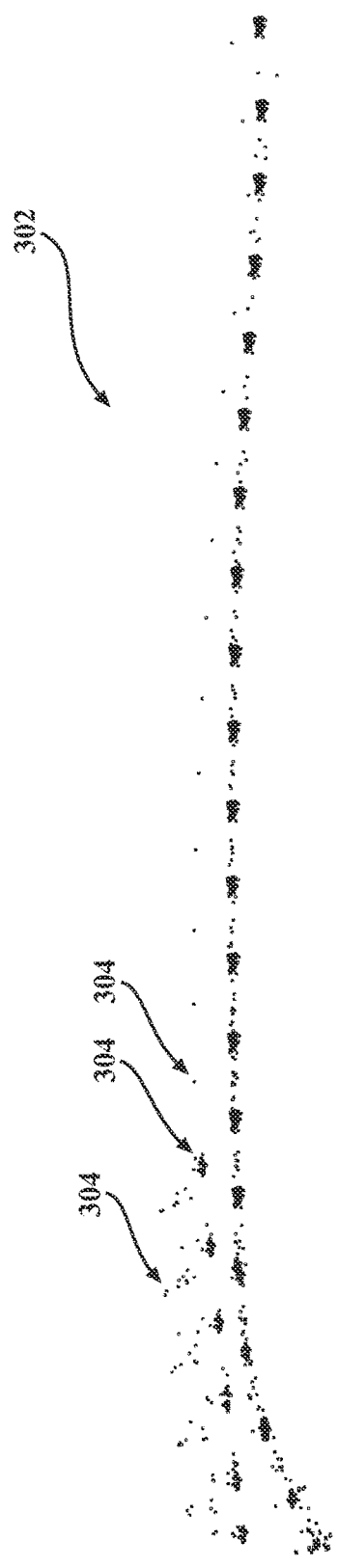
FIGS. 3A-3E illustrate an example of generating a road graph from a plurality of points using the overlapping tile arrangements.

FIGS. 3A-3E illustrate an example of generating a road graph from a plurality of points using the overlapping tile arrangements 210A, 210B, 210C, 210D, 230. As an example and as shown in FIG. 3A, sensor data 302 includes points 304. The points 304 are distributed within a region. The points 304 are observations of a roadway and may have metadata that includes details such as the source of sensor data 302, geographical location in terms of coordinates, and environmental conditions such as elevation levels, light levels, humidity levels, temperature levels, and/or precipitation levels. The points 304 may be trace points which identify the positions of a vehicle travelling along a roadway. As an example, each point 304 may indicate a position of a vehicle along the roadway when the sensor data 302 is captured. The points 304 may originate from a single vehicle travelling along a roadway. Alternatively, the points 304 may originate from two or more vehicles travelling along one or more roadways.

The sensor data 302 includes left key points, which identify a left boundary of a roadway that the vehicle is traveling on and right key points, which identify a right boundary of the roadway that the vehicle is traveling on. Each point 304 may be the center of the roadway. More specifically, each point 304 may be the center point between a left key point and a right key point. As another example, the sensor data 302 may include a field of view and each point 304 may be a centroid of the field of view.

Figure 3B:
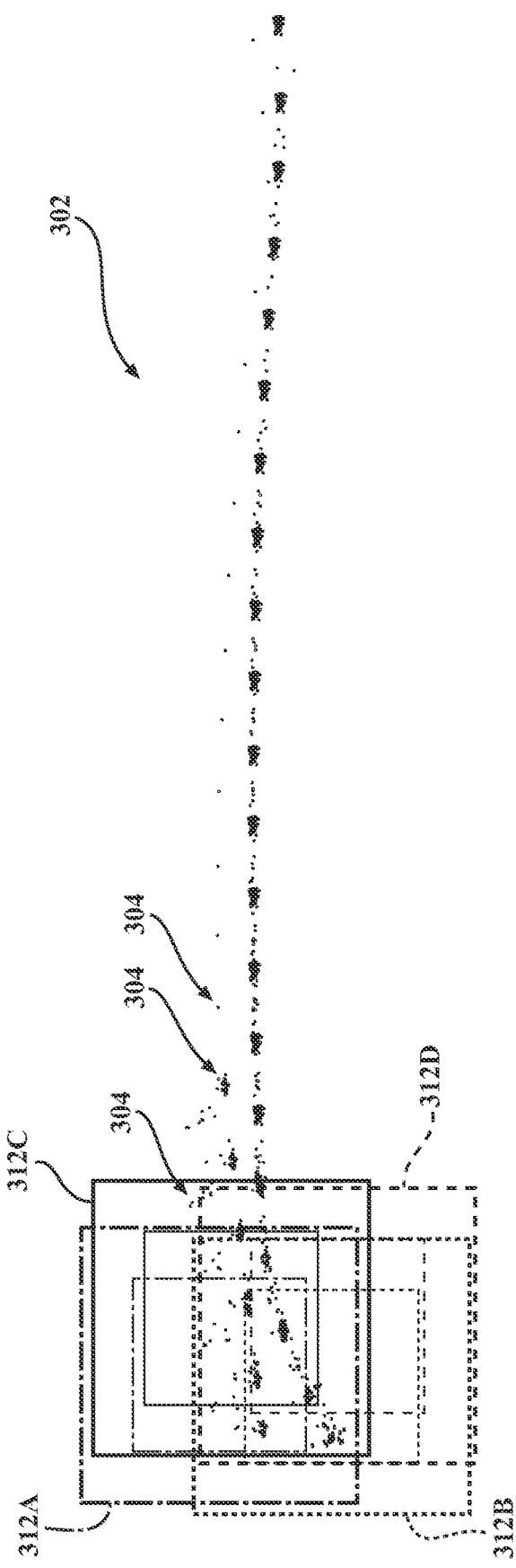

As an example and as shown in FIG. 3B, tiles 312A, 312B, 312C, 312D are overlaid over the points 304 in an overlapping manner, similar to the tile arrangements 210A, 210B, 210C, 210D, 230, disclosed above. Although, a plurality of overlapping tiles would cover or overlay the entire region of interest, for simplicity, only four overlapping tiles 312A, 312B, 312C, 312D are shown. The four overlapping tiles 312A, 312B, 312C, 312D are shown slightly offset so that the inner and outer borders of the tiles 312A, 312B, 312C, 312D are distinguishable. However and as an example, the road graph generating system 100 may overlay overlapping tiles 312A, 312B, 312C, 312D over all the points 304 within the region of interest. In other words, the road graph generating system 100 may partition the region of interest by overlaying the overlapping tiles 312A, 312B, 312C, 312D on the region of interest. The size of overlap between neighboring tiles 312A, 312B, 312C, 312D may be based on a maximum distance between two of the plurality of points 304 that may be related and may be connected by an edge. Two points 304 may be related if the two points 304 have, as an example, a common vehicle source or if the two points 304 are within a predetermined distance of each other.

Figure 3C:
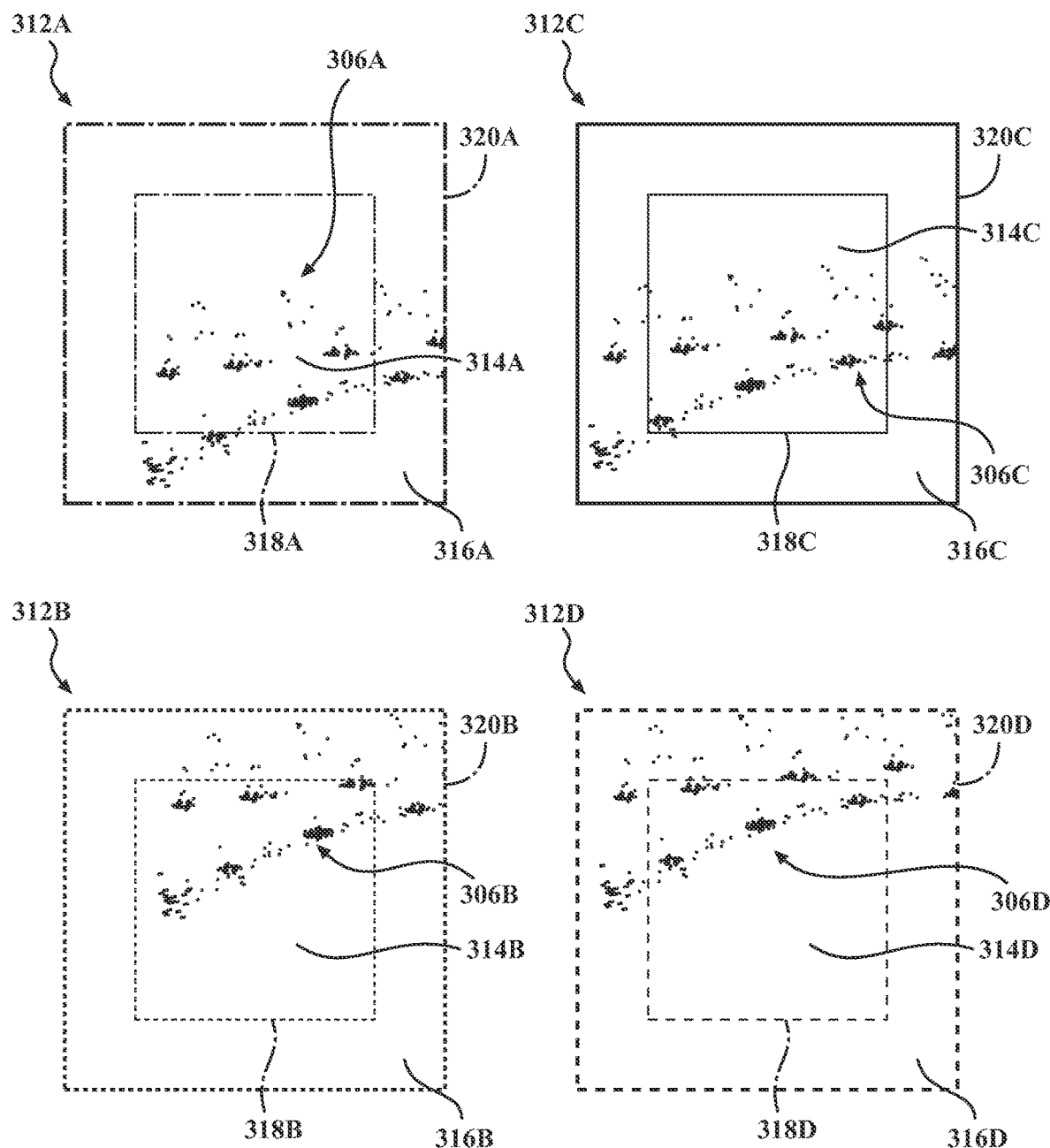

As an example and as shown in FIG. 3C, each tile 312A, 312B, 312C, 312D captures a portion 306A, 306B, 306C, 306D of the points 304 in the region of interest. As the tiles 312A, 312B, 312C, 312D are overlapping, the portions 306A, 306B, 306C, 306D of the points 304 in the region of interest also overlap. The first tile 312A has an inner area 314A and an outer area 316A. The second tile 312B has an inner area 314B and an outer area 316B. The third tile 312C has an inner area 314C and an outer area 316C. The fourth tile 312D has an inner area 314D and an outer area 316D.

Figure 3D:
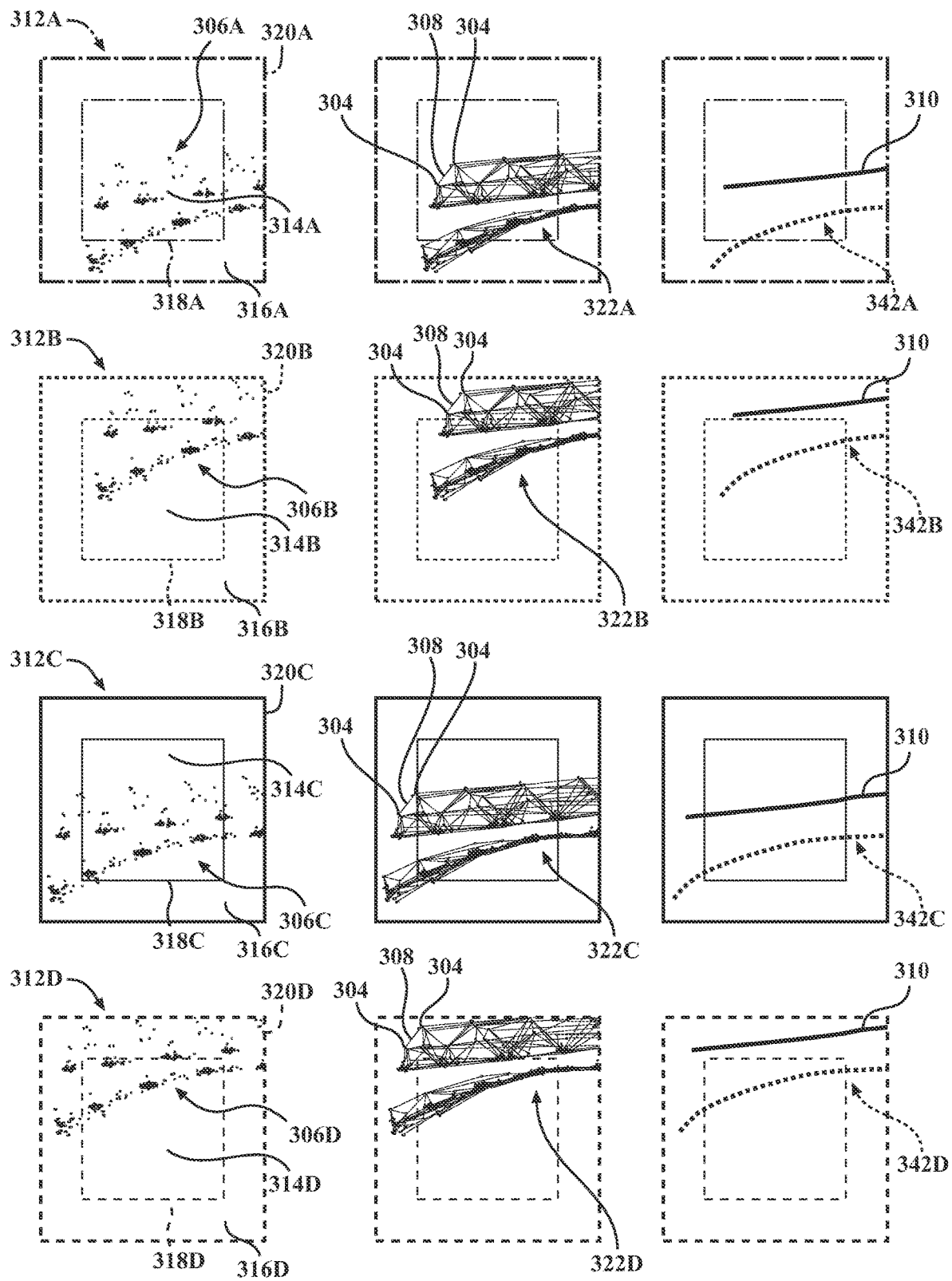

FIG. 3D illustrates an example of generating a portion 342A, 342B, 342C, 342D of a road graph 340 from a portion 306A, 306B, 306C, 306D of the points 304 in the region of interest. A road graph generating system 100 connects, using an edge 308, two points 304 in both the inner area 314A, 314B, 314C, 314D and outer area 316A, 316B, 316C, 316D of the tiles 312A, 312B, 312C, 312D based on at least one predetermined criterion to form a portion 322A, 322B, 322C, 322D of a frame graph. The predetermined criterion may include two points 304 having a common vehicle source, two points 304 having a distance from each other that is less than a predetermined distance, two points 304 having a gradient between each other that is less than a predetermined percentage, two points 304 having fields of view that have an altitude difference that is less than a predetermined height, and two points 304 having fields of view that have an overlapping portion and the overlapping portion is more than a predetermined value.

In the example of the predetermined criterion including two points 304 that have a common vehicle source, the portions 322A, 322B, 322C, 322D of the frame graph may include the edges 308 between two points 304 that originated from a single vehicle or a single vehicle sensor. In the example of the predetermined criterion including two points 304 having a distance from each other that is less than a predetermined distance away from each other. In the example of the predetermined criterion, including two points 304 having a gradient between each other that is less than a predetermined percentage, the portions 322A, 322B, 322C, 322D of the frame graph may include the edges 308 between two points 304 that have a gradient that is less than the predetermined percentage, e.g., 10%. In the example of the predetermined criterion including two points 304 having fields of view that have an altitude difference that is less than a predetermined height, the portions 322A, 322B, 322C, 322D of the frame graph may include the edges 308 between two points 304 that have less than the predetermined height difference, e.g., 20 meters.

The portions 322A, 322B, 322C, 322D of the frame graph may include points 304 and edges 308 that meet one or more of the predetermined criteria. Alternatively, the portions 322A, 322B, 322C, 322D of the frame graph may include points 304 and edges 308 that meet all the predetermined criteria.

As an example, the road graph generating system 100 may utilize an image skeletonization method to derive a portion 342A, 342B, 342C, 342D of the road graph 340 from the portion 322A, 322B, 322C, 322D of frame graph. In such an example, the road graph generating system 100 may collapse the dense graph of points 304 and edges 308 into single lines 310, forming a portion 342A, 342B, 342C, 342D of the road graph 340 that identifies roadways.

The road graph generating system 100 may combine the portions 342A, 342B, 342C, 342D of the road graph 340 that are within the inner areas 314A, 314B, 314C, 314D of the tiles 312A, 312B, 312C, 312D. The road graph generating system 100 may identify the lines 310 that terminate within the outer areas 316A, 316B, 316C, 316D and the lines 310 that appear to extend past the outer areas 316A, 316B, 316C, 316D. For the portion 342A, 342B, 342C, 342D of the road graph 340 that terminates within the outer area 316A, 316B, 316C, 316D, the road graph generating system 100 may discard the portion 342A, 342B, 342C, 342D of the road graph 340 in the outer area 316A, 316B, 316C, 316D. For the portion 342A, 342B, 342C, 342D of the road graph 340 that extends past the inner area 314A, 314B, 314C, 314D, the road graph generating system 100 may retain the portion 342A, 342B, 342C, 342D of the road graph 340 and may utilize the retained portion to merge the road graphs 340 of the neighboring tiles 312A, 312B, 312C, 312D and the road graphs 340 within the neighboring tiles 312A, 312B, 312C, 312D.

Figure 3E:
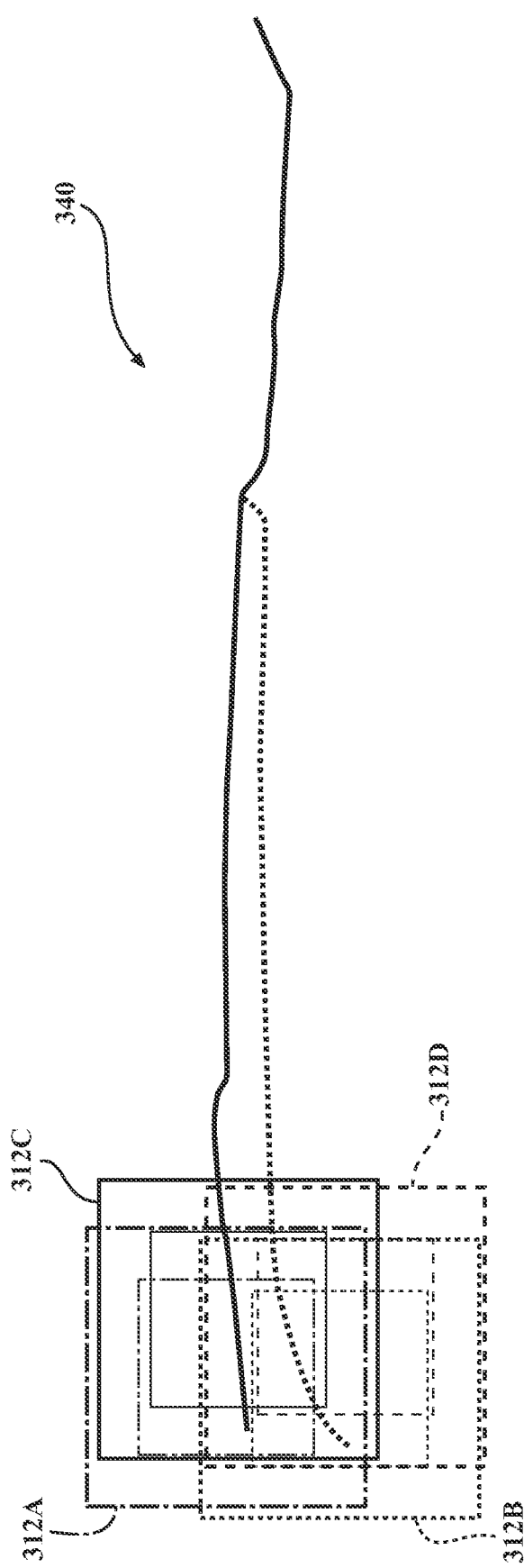

FIG. 3E illustrates an example of forming a road graph 340 by combining the portions 342A, 342B, 342C, 342D of the road graph 340 using the overlapping tiles 312A, 312B, 312C, 312D. Although the whole region of interest would be overlaid with overlapping tiles, for clarity, the four tiles 312A, 312B, 312C, 312D with portions 342A, 342B, 342C, 342D of the road graph 340 are shown.

Figure 4:
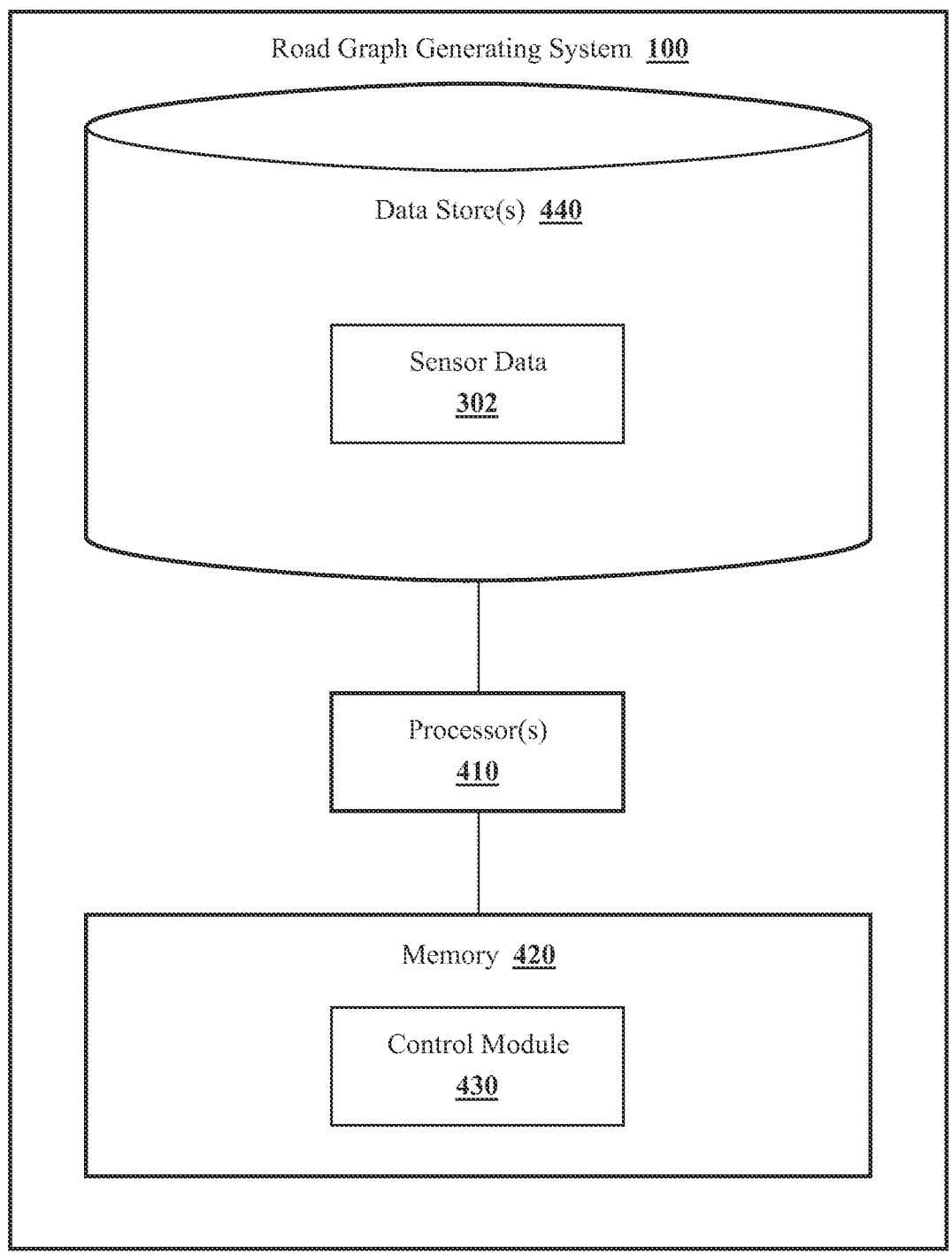
FIG. 4 illustrates one embodiment of the road graph generating system 100.

With reference to FIG. 4, one embodiment of the road graph generating system 100 is illustrated. The road graph generating system 100 is shown as including a processor 410. Accordingly, the processor 410 may be a part of the road graph generating system 100 or the road graph generating system 100 may access the processor 410 through a data bus or another communication path. In one or more embodiments, the processor 410 is an application-specific integrated circuit (ASIC) that is configured to implement functions associated with a control module 430. In general, the processor 410 is an electronic processor, such as a microprocessor, which is capable of performing various functions as described herein.

In one embodiment, the road graph generating system 100 includes a memory 420 that stores the control module 430 and/or other modules that may function in support of generating a road graph 340 from a plurality of points. The memory 420 is a random-access memory (RAM), read-only memory (ROM), a hard disk drive, a flash memory, or another suitable memory for storing the control module 430. The control module 430 is, for example, machine-readable instructions that, when executed by the processor 410, cause the processor 410 to perform the various functions disclosed herein. In further arrangements, the control module 430 is a logic, integrated circuit, or another device for performing the noted functions that includes the instructions integrated therein.

Furthermore, in one embodiment, the road graph generating system 100 includes a data store 440. The data store 440 is, in one arrangement, an electronic data structure stored in the memory 420 or another data store, and that is configured with routines that can be executed by the processor 410 for analyzing stored data, providing stored data, organizing stored data, and so on. Thus, in one embodiment, the data store 440 stores data used by the control module 430 in executing various functions.

For example, as depicted in FIG. 4, the data store 440 includes the sensor data 302 along with, for example, other information that is used and/or produced by the control module 430. The sensor data 302 includes information about the points 304 and may further include metadata related to the points 304. Vehicle sensors and/or any other suitable sensors may detect the points 304.

While the road graph generating system 100 is illustrated as including the various data elements, it should be appreciated that one or more of the illustrated data elements may not be included within the data store 440 in various implementations and may be included in a data store that is external to the road graph generating system 100. In any case, the road graph generating system 100 stores various data elements in the data store 440 to support functions of the control module 430.

In one embodiment, the control module 430 includes instructions that, when executed by the processor(s) 410, cause the processor(s) 410 to partition a region of interest into a plurality of tiles 102. The region of interest includes a plurality of points 304. Each of the plurality of points 304 may be a position of a vehicle along a roadway. As shown above, each of the plurality of tiles 102 has an inner area 104 and an outer area 106. Each of the plurality of tiles 102 has an inner border 108 encapsulating the inner area 104 and separating the inner area 104 from the outer area 106. Each of the plurality of tiles 102 has an outer border 110 encapsulating the outer area 106. The size of the inner area 104 may be based on user input. As such, the size of the inner area 104 may be set by a user. The shape of the inner area 104, the inner border 108, the outer border 110 may be any suitable shape such as a circle, any multi-sided polygon including squares, rectangles, and/or hexagons. As an example, the inner border 108 and the outer border 110 may be square shaped. The distance 112 between the inner border 108 and the outer border 110 may be any suitable length. As an example, the distance 112 between the inner border 108 and the outer border 110 may be based on a minimum road branch length, which is the minimum distance that would be considered a road.

As previously disclosed, the plurality of tiles 312A, 312B, 312C, 312D overlap neighboring tiles 312A, 312B, 312C, 312D. The size of overlap between neighboring tiles 312A, 312B, 312C, 312D may be any suitable size. As an example, the size of overlap may be based on a maximum distance between two of the plurality of points 304 connected by an edge 308. As such, the width of a portion of the tiles 312A, 312B, 312C, 312D that overlap with neighboring tiles 312A, 312B, 312C, 312D may be set to the maximum distance between two points 304 that are connected by an edge 308. As another example, the width of the portion of the tiles 312A, 312B, 312C, 312D that overlap with neighboring tiles 312A, 312B, 312C, 312D may be based by user input and set by a user.

In one embodiment, the control module 430 includes instructions that, when executed by the processor(s) 410, cause the processor(s) 410 to generate a portion 322A, 322B, 322C, 322D of a frame graph for each of the plurality of tiles 312A, 312B, 312C, 312D, based on one or more of the plurality of points 304 associated with the each of the plurality of tiles 312A, 312B, 312C, 312D. In one or more arrangements, the control module 430 associates the points 304 within the inner area 314A, 314B, 314C, 314D and the outer area 316A, 316B, 316C, 316D of a tile 312A, 312B, 312C, 312D with the tile 312A, 312B, 312C, 312D. As such and as shown above, the points 304 within the inner area 314A, 314B, 314C, 314D and the outer area 316A, 316B, 316C, 316D of a tile 312A, 312B, 312C, 312D are associated with the tile 312A, 312B, 312C, 312D. The control module 430 may then generate portions 322A, 322B, 322C, 322D of the frame graph based on the points 304 within the outer border of the tile 312A, 312B, 312C, 312D as disclosed in FIG. 3D.

In one embodiment, the control module 430 includes instructions that, when executed by the processor(s) 410, cause the processor(s) 410 to generate a portion 342A, 342B, 342C, 342D of a road graph 340 based on the portion 322A, 322B, 322C, 322D of a frame graph within each tile 312A, 312B, 312C, 312D. The control module 430 may generate a portion 342A, 342B, 342C, 342D of the road graph 340 from the portions 322A, 322B, 322C, 322D of the frame graphs in the overlapping tiles 312A, 312B, 312C, 312D. The control module 430 may utilize any suitable method to extract the portions 342A, 342B, 342C, 342D of the road graph 340 and the portions of the roadways from the portions 322A, 322B, 322C, 322D of the frame graph.

In one embodiment, the control module 430 includes instructions that, when executed by the processor(s) 410, cause the processor(s) 410 to combine the portion 342A, 342B, 342C, 342D of the road graph 340 in the inner area 314A, 314B, 314C, 314D into a final version of the road graph 340 based on the plurality of points 304 in the outer area 316A, 316B, 316C, 316D of each of the plurality of tiles 312A, 312B, 312C, 312D.

In one or more arrangements, the control module 430 may combine the portions 342A, 342B, 342C, 342D of the road graph 340 in the inner area 314A, 314B, 314C, 314D using the shapes of the roadways and any suitable image matching technique. The control module 430 may discard any portion 342A, 342B, 342C, 342D of the road graph 340 and roadway that terminates between the inner border 318A, 318B, 318C, 318D and the outer border 320A, 320B, 320C, 320D. The control module 430 may retain any portion 342A, 342B, 342C, 342D of the road graph 340 and roadway that appears to extend past the outer border 320A, 320B, 320C, 320D. The control module 430 may utilize the retain portion for image matching and aligning the tiles 312A, 312B, 312C, 312D. Upon aligning the tiles 312A, 312B, 312C, 312D, the control module 430 may combine the portions 342A, 342B, 342C, 3442D of the road graph 340 to form a complete road graph 340.

In one embodiment, the control module 430 includes instructions that, when executed by the processor(s) 410, cause the processor(s) 410 to output the road graph 340 to an entity. In one or more arrangements and as previously mentioned, the control module 430 may generate the road graph 340 and output the road graph 340 in any suitable format to an entity such as a map database or a traffic database.

Figure 5:
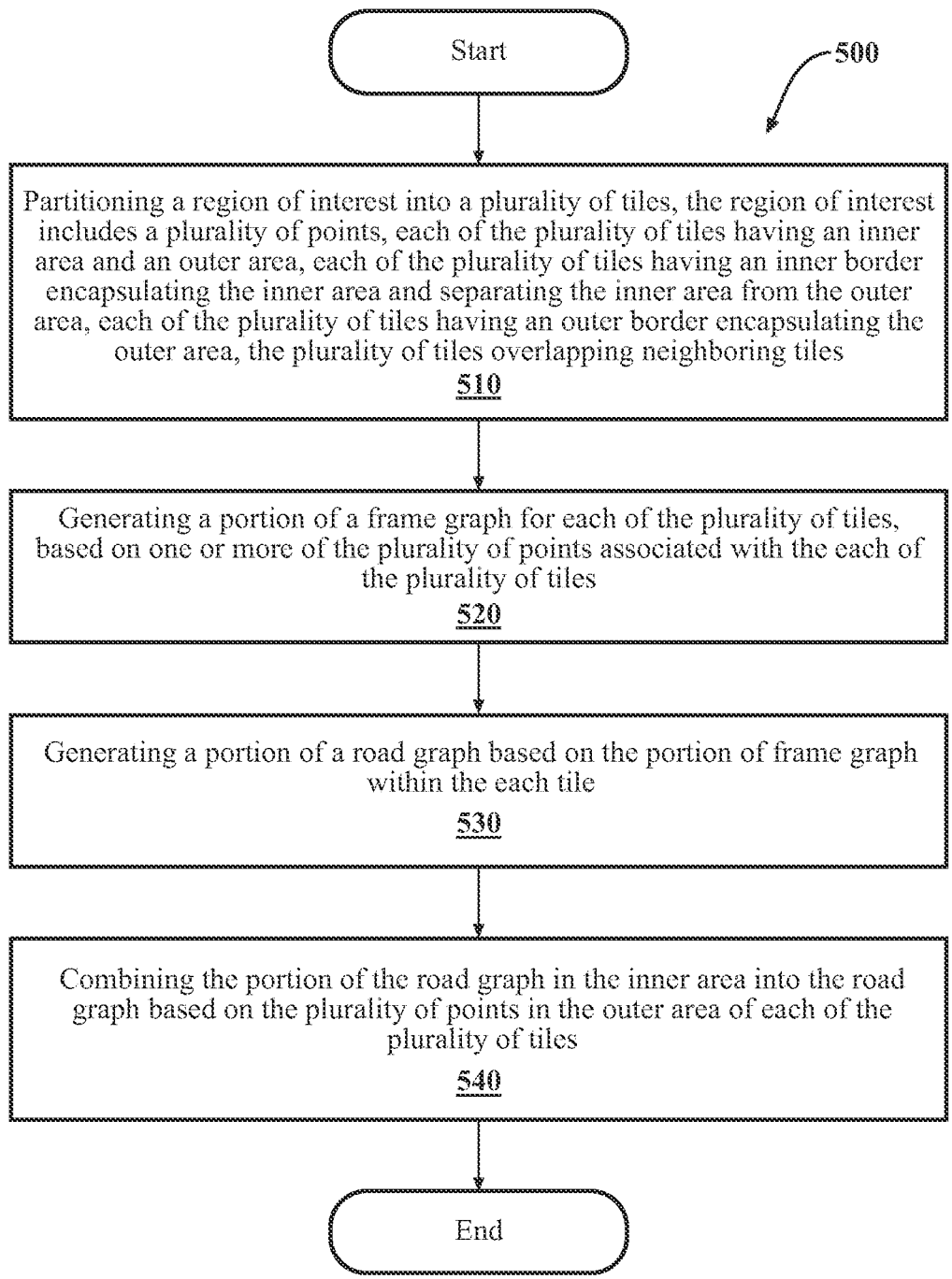
FIG. 5 is a flowchart illustrating one embodiment of a method associated with generating a road graph from a plurality of points using the overlapping tile arrangements.

FIG. 5 is a flowchart illustrating one embodiment of a method 500 associated with generating a road graph 340 from a plurality of points 304. The method 500 will be described from the viewpoint of the road graph generating system 100. However, the method 500 may be adapted to be executed in any one of several different situations and not necessarily by the road graph generating system 100.

At step 510, the control module 430 may cause the processor(s) 410 to partition a region of interest into a plurality of tiles 312A, 312B, 312C, 312D. The region of interest includes a plurality of points 304. As previously mentioned, each of the plurality of tiles 312A, 312B, 312C, 312D has an inner area 314A, 314B, 314C, 314D and an outer area 316A, 316B, 316C, 316D, and each of the plurality of tiles has an inner border 318A, 318B, 318C, 318D encapsulating the inner area 314A, 314B, 314C, 314D and separating the inner area 314A, 314B, 314C, 314D from the outer area 316A, 316B, 316C, 316D. Further, each of the plurality of tiles 312A, 312B, 312C, 312D has an outer border 320A, 320B, 320C, 320D encapsulating the outer area 316A, 316B, 316C, 316D. Also, as previously mentioned, the plurality of tiles 312A, 312B, 312C, 312D overlap neighboring tiles 312A, 312B, 312C, 312D.

At step 520, the control module 430 may cause the processor(s) 410 to generate a portion 322A, 322B, 322C, 322D of a frame graph for each of the plurality of tiles 312A, 312B, 312C, 312D based on one or more of the plurality of points 304 associated with the each of the plurality of tiles 312A, 312B, 312C, 312D. As previously disclosed, the control module 430 may generate a portion 322A, 322B, 322C, 322D of the frame graph for each tile 312A, 312B, 312C, 312D based on the plurality of points 304 that the tile 312A, 312B, 312C, 312D has been laid over.

At step 530, the control module 430 may cause the processor(s) 410 to generate a portion 342A, 342B, 342C, 342D of a road graph 340 based on the portion 322A, 322B, 322C, 322D of frame graph within the tile 312A, 312B, 312C, 312D. As previously mentioned, the control module 430 may extract a portion 342A, 342B, 342C, 342D of the road graph 340 from the portion 322A, 322B, 322C, 322D of the frame graph within the tile 312A, 312B, 312C, 312D using any suitable method.

At step 540, the control module 430 may cause the processor(s) 410 to combine the portion 342A, 342B, 342C, 342D of the road graph 340 in the inner areas 314A, 314B, 314C, 314D into a final version of the road graph 340 based on the plurality of points 304 in the outer area 316A, 316B, 316C, 316D of each of the plurality of tiles 312A, 312B, 312C, 312D. The road graph 340 may be a complete road graph 340 that identifies one or more roadways within the region of interest. The control module 430 may then output the road graph 340 to an entity such as a database in any suitable format.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory storing machine-readable instructions that, when executed by the processor, cause the processor to:
partition a region of interest into a plurality of tiles, the region of interest includes a plurality of points, each of the plurality of tiles having an inner area and an outer area, each of the plurality of tiles having an inner border encapsulating the inner area and separating the inner area from the outer area, each of the plurality of tiles having an outer border encapsulating the outer area, the plurality of tiles overlapping neighboring tiles;
generate a portion of a frame graph for each of the plurality of tiles, based on one or more of the plurality of points associated with the each of the plurality of tiles;

generate a portion of a road graph based on the portion of frame graph within the each tile; and combine the portion of the road graph in the inner area into a final version of the road graph based on the plurality of points in the outer area of each of the plurality of tiles.

2. The system of claim 1, wherein the inner border is square shaped, and the outer border is square shaped.

3. The system of claim 1, wherein a distance between the inner border and the outer border is based on a minimum road branch length.

4. The system of claim 1, wherein a size of the inner area is based on user input.

5. The system of claim 1, wherein a size of overlap between neighboring tiles is based on a maximum distance between two of the plurality of points connected by an edge.

6. The system of claim 1, wherein a size of overlap between neighboring tiles is based on user input.

7. The system of claim 1, wherein each of the plurality of points is a position of a vehicle along a road.

8. A method comprising:

partitioning a region of interest into a plurality of tiles, the region of interest includes a plurality of points, each of the plurality of tiles having an inner area and an outer area, each of the plurality of tiles having an inner border encapsulating the inner area and separating the inner area from the outer area, each of the plurality of tiles having an outer border encapsulating the outer area, the plurality of tiles overlapping neighboring tiles;

generating a portion of a frame graph for each of the plurality of tiles, based on one or more of the plurality of points associated with the each of the plurality of tiles;

generating a portion of a road graph based on the portion of frame graph within the each tile; and combining the portion of the road graph in the inner area into a final version of the road graph based on the plurality of points in the outer area of each of the plurality of tiles.

9. The method of claim 8, wherein the inner border is square shaped, and the outer border is square shaped.

10. The method of claim 8, wherein a distance between the inner border and the outer border is based on a minimum road branch length.

11. The method of claim 8, wherein a size of the inner area is based on user input.

12. The method of claim 8, wherein a size of overlap between neighboring tiles is based on a maximum distance between two of the plurality of points connected by an edge.

13. The method of claim 8, wherein a size of overlap between neighboring tiles is based on user input.

14. The method of claim 8, wherein each of the plurality of points is a position of a vehicle along a road.

15. A non-transitory computer-readable medium including instructions that when executed by a processor cause the processor to:

partition a region of interest into a plurality of tiles, the region of interest includes a plurality of points, each of the plurality of tiles having an inner area and an outer area, each of the plurality of tiles having an inner border encapsulating the inner area and separating the inner area from the outer area, each of the plurality of tiles having an outer border encapsulating the outer area, the plurality of tiles overlapping neighboring tiles;

generate a portion of a frame graph for each of the plurality of tiles, based on one or more of the plurality of points associated with the each of the plurality of tiles;

generate a portion of a road graph based on the portion of frame graph within the each tile; and combine the portion of the road graph in the inner area into a final version of the road graph based on the plurality of points in the outer area of each of the plurality of tiles.

16. The non-transitory computer-readable medium of claim 15, wherein the inner border is square shaped, and the outer border is square shaped.

17. The non-transitory computer-readable medium of claim 15, wherein a distance between the inner border and the outer border is based on a minimum road branch length.

18. The non-transitory computer-readable medium of claim 15, wherein a size of the inner area is based on user input.

19. The non-transitory computer-readable medium of claim 15, wherein a size of overlap between neighboring tiles is based on a maximum distance between two of the plurality of points connected by an edge.

20. The non-transitory computer-readable medium of claim 15, wherein a size of overlap between neighboring tiles is based on user input.

\* \* \* \* \*